United States Patent [19]

Sakamoto et al.

[11] Patent Number: 5,121,830
[45] Date of Patent: Jun. 16, 1992

[54] CONVEYOR MEANS USING LINEAR MOTOR

[75] Inventors: Shunji Sakamoto; Toshihiko Hoshino, both of Hiroshima, Japan

[73] Assignee: Mazda Motor Corporation, Japan

[21] Appl. No.: 787,726

[22] Filed: Nov. 1, 1991

Related U.S. Application Data

[63] Continuation of Ser. No. 531,830, Jun. 1, 1990, abandoned.

[30] Foreign Application Priority Data

| Jun. 1, 1989 | [JP] | Japan | 1-139930 |
| Jun. 28, 1989 | [JP] | Japan | 1-166242 |
| Jul. 19, 1989 | [JP] | Japan | 1-188376 |
| Aug. 11, 1989 | [JP] | Japan | 1-209263 |
| Aug. 12, 1989 | [JP] | Japan | 1-209142 |

[51] Int. Cl.⁵ ............................................. B65G 35/00
[52] U.S. Cl. ................................. 198/619; 104/290; 104/292
[58] Field of Search ............... 198/619, 465.1, 465.2; 104/140, 290, 292

[56] References Cited

U.S. PATENT DOCUMENTS

| 4,613,805 | 9/1986 | Matsuo et al. | 104/292 X |
| 4,718,539 | 1/1988 | Fukuwatari et al. | 198/619 |
| 4,800,818 | 1/1989 | Kawaguchi et al. | 104/290 |
| 4,841,869 | 6/1989 | Takeuchi et al. | 104/140 X |

FOREIGN PATENT DOCUMENTS

| 0188657 | 7/1986 | European Pat. Off. . |
| 0265570 | 5/1988 | European Pat. Off. . |
| 59-31208 | 2/1984 | Japan | 198/619 |
| 60-2337803 | 11/1985 | Japan . |
| 62-210162 | 9/1987 | Japan . |

Primary Examiner—Joseph E. Valenza
Assistant Examiner—Tuan N. Nguyen
Attorney, Agent, or Firm—Thompson, Hine and Flory

[57] ABSTRACT

A conveyor with linear motors provided for each working station of the transporting line having plural stations. A controller which controls working of two linear motors when two linear motors convey articles between adjoining stations is provided for every two adjoining stations. The controller is provided with a linear motor controller which controls linear motors for transportation and a sequence controller and a station controller which control the transporting line through the medium of the linear motor controller.

8 Claims, 16 Drawing Sheets

CONVEYOR MEANS USING LINEAR MOTOR

This is a continuation of co-pending application Ser. No. 07/531,830, filed Jun. 1, 1990, now abandoned.

BACKGROUND OF THE INVENTION

1. Field of the Invention

This invention relates to a conveyor means using linear motors for conveying articles.

2. Description of the Prior Art

From the viewpoint of increasing the production efficiency and improving the working environment, it has recently been desired at the production line of manufacturing plant to convey articles speedily and silently. As the conveyor means to meet such requirement, it has been known to provide a linear motor comprising linear coils and reaction members at each working station of the production line and to pass on an article to the succeeding working station by the linear motor.

The conveyor means using linear motors as mentioned above has the following construction.

As shown in FIG. 26, for example, either of linear motor coils b and a reaction member c comprising a linear motor a (linear motor coils b in the case of FIG. 26) is made a stator or fixed element, which is arranged below and along a roller conveyor e comprising a plurality of rollers d. The other (reaction member c in the case of FIG. 26) is made a rotor or moving element, which is fitted to a pallet f (which is conveyed) through the medium of a fitting member g. By thrust F which is generated at the rotor (reaction member c) due to electromagnetic action between the linear motor coils b and the reaction member c, the pallet f and an article placed thereon are conveyed through the medium of the rotor (reaction member c).

In the conveyor means using linear motors of this kind, as disclosed by the Japanese Patent Application Laying Open Gazette No. 62-210162, for example, a controller is provided for a linear motor of each working station and when a pallet is conveyed between adjoining stations, which the first half part of conveyance is controlled by a controller corresponding to the working station on the upstream side in the conveying direction, the latter half part is controlled by a controller corresponding to the working station on the downstream side in the conveying direction.

In the above conventional control system, there is caused a sphere which is entirely outside the control by a controller in the course of conveying and as shown in FIG. 25 by broken lines, the conveying speed V becomes easy to vary in that sphere, with the result of bad influence upon deceleration control, reduction in precision of stop position and decrease in transporting efficiency.

Also, in the above conventional control system, the speed control on a transporting pallet on each working station is done entirely by a controller and the control on the transfer of a transporting pallet between adjoining working stations is carried out by exchange of signals between an overall controller and a controller. Therefore, in the case of actual conveying, a transporting pallet must be conveyed while the controller is exchanging signals with the overall controller at all times. Thus, control is complicated and satisfactory reliability cannot be obtained. Moreover, since it is so designed that control on a carrier existing at each unit is done by the controller, even in case of emergency when the carrier must be stopped suddenly, the carrier stops only after a signal is given to the controller from the overall controller. Thus, due to delayed control, the carrier cannot be stopped instantly in case of emergency.

In sending an article to a plurality of working stations in regular sequence by using a linear motor, in the case where adjoining articles are conveyed at the same time or in the case where conveying of an article on the rear side is started while an article on the front side in the conveying direction is being conveyed, there is a fear that the articles collide with each other because the space between adjoining working stations is short and transporting speed is very high.

In order to prevent collision of articles during conveying, a conveyor mans ( for example, the Japanese Patent Application Laying Open Gazette No. 60-237803), by which after an article on the front side is conveyed, it is confirmed that such article does not remain in the conveying area of an article on the rear side and then conveying of the article on the rear side is started, has been suggested.

In the above conveyor means, however, delay in conveying of articles on the front side will accumulate at the transportation of articles on the rear side, with the result that time required for transporting at the production line as a whole increases and in its turn, transporting efficiency or production efficiency will lower.

A main object of the present invention is to provide a conveyor means using linear motors which ensures stabilized conveyance by controlling transportation of articles between adjoining stations at all times by one controller. In order to attain this object, in the present invention a linear motor for conveyance comprising linear motor coils and a reaction member is provided at each station of the transporting line (having a plurality of stations) and one controller is provided for every two adjoining stations so as to control the working of two corresponding linear motors for conveyance when articles are conveyed by said two corresponding linear motors between adjoining stations. Thus, conveyance of articles by the linear motor is always controlled by the controller, with the result of stabilization of transportation control, improvements of stop position precision and transporting efficiency, etc.

In the present invention, in order to carry out the transfer of a transporting pallet between adjoining working stations reliably and easily, the controller is provided with a sequence controller which effects the speed control on linear motors for conveyance of two adjoining working stations. The controller is also provided with a linear motor controller which controls linear motors for conveyance. While the sequence controller controls the transporting line through the medium of the linear motor controller, the linear motor controller carries out phase control of linear motor excitation.

Under the above construction, the sequence controller carries out control on the speed of the linear motor between adjoining working stations and the linear motor controller carries out phase control of the linear motor (linear motor coil) excitation. Thus, transfer of a transporting pallet between two working stations is carried out smoothly and easily, without signal output from the linear motor controller to the sequence controller and without complication of control. Also, since the sequence controller monitors only adjoining stations, even if trouble occurs at a certain station, conveyance at other stations can be carried out.

In the case where adjacent articles are conveyed at the same time or in the case where conveying of an article on the rear side in the conveying direction is started while an article on the front side in the conveying direction is being conveyed, there is a fear that articles collide with each other. In order to prevent such collision and thereby improve transporting efficiency by changing the transporting speed of articles in transportation properly, the present invention provides a conveyor means using linear motors, having a control means to control working of linear motors for conveyance, a position detecting means to detect the actual positions of adjoining articles in transportation and a correcting means to correct the transporting speed of at least one of adjoining articles under control by said control means on the basis of a signal given by said position detecting means so as to keep the space between adjoining articles at more than a specific value. In this conveyor means, after completion of work at the working station adjoining articles are so controlled that they are conveyed at the same time or so controlled that conveying of an article on the rear side is started while an article on the front side in the conveying direction is being conveyed. In the present invention, therefore, in the case where an article approaches abnormally to an adjoining article from a certain cause when it is being conveyed at a predetermined set speed between adjoining working stations on the basis of the control by a control means which controls working of a linear motor, this phenomenon is detected by a position detecting means and on the basis of the result of detection, a correcting means corrects the conveying speed of at least one of the adjoining articles under control by said control means, whereby the space between adjoining articles in transportation is kept at more than a specific value. Thus, collision of articles with each other is prevented and transporting efficiency can be improved.

In order to eliminate the delayed control and to ensure instant stop in case of emergency, the present invention has for its object to provide a conveyor means using linear motors, having the controller provided with a linear motor controller to control linear motors for conveyance and a station controller to control the transporting line through the medium of said linear motor controller, whereby control on the linear motor under normal condition is done by the linear motor controller but in case of emergency a stop signal is outputted directly to a linear motor from the station controller.

Therefore, under normal conditions control of the linear motor is done by the linear motor controller but in case of emergency the linear motor is controlled directly by the station controller and a stop signal is outputted without delay to the linear motor. Thus, delayed control is eliminated and a transporting pallet (article in transportation) can be stopped instantly.

In order to avoid a longer time required for transporting all articles and to save consumption energy, the present invention provides a conveyor means using linear motors, having a controller which is so composed that it sends articles to a plurality of working stations in regular sequence by using a linear motor, a fixed speed area detecting means to detect the article transporting fixed speed area of each station and an acceleration control means to effect acceleration for transporting articles of a specific station upon receiving output of said fixed speed area detecting means at the article transporting fixed speed area of the station preceding said specific station. Thus, in each station, acceleration for article transporting is effected at the article transporting fixed speed area of the station preceding said each station, whereby a longer time required for transporting all articles can be avoided and consumption energy can be saved.

BRIEF DESCRIPTION OF THE DRAWINGS

FIG. 1 to FIG. 4 show a first embodiment of the present invention, in which:

FIG. 1 is a front view of a main part of a conveyor means using a linear motor;

FIG. 2 is a plan view of the main part shown in FIG. 1;

FIG. 3 is a cross section, taken along the line III—III in FIG. 1;

FIG. 4 is an explanatory drawing of the control system for controlling a linear motor;

FIG. 5 to FIG. 8 show a second embodiment of the present invention, in which:

FIG. 5 is a plan view of a conveyor means using a linear motor;

FIG. 6 is a cross section, taken along the line VI—VI in FIG. 5;

FIG. 7 is an explanatory drawing of the control system for controlling a linear motor;

FIG. 8 is a block diagram of the control system of the whole assembling line of motor vehicle;

FIG. 9 to FIG. 12 show a third embodiment of the present invention, in which:

FIG. 9 is an explanatory drawing of the control system for controlling a linear motor;

FIG. 10 is a rough composition drawing, showing the composition of a position detecting means;

FIG. 11 is a flow chart showing the flow of control;

FIG. 13 to FIG. 16 show a fourth embodiment of the present invention, in which:

FIG. 13 is a block diagram of the control system for controlling a linear motor;

FIG. 14 is a detailed block diagram of the control system in FIG. 13;

FIG. 15 is an explanatory drawing of the speed change of a pallet;

FIG. 16 is an explanatory drawing of the speed control at the time of start;

FIG. 17 to FIG. 22 show a fifth embodiment of the present invention, in which:

FIG. 17 is a block diagram of the control system for controlling a linear motor;

FIG. 18 shows the speed change in transportation;

FIG. 19 is a flow chart showing the flow of control;

FIG. 20 shows the relative speed change at each station;

FIG. 21 shows the change in consumption electric current at five working stations;

FIG. 22 shows the change in consumption electric current at the whole transporting line;

DETAILED DESCRIPTION OF THE INVENTION

Embodiments of the present invention are described below, on the basis of the drawings.

EMBODIMENT 1

Figure 1:
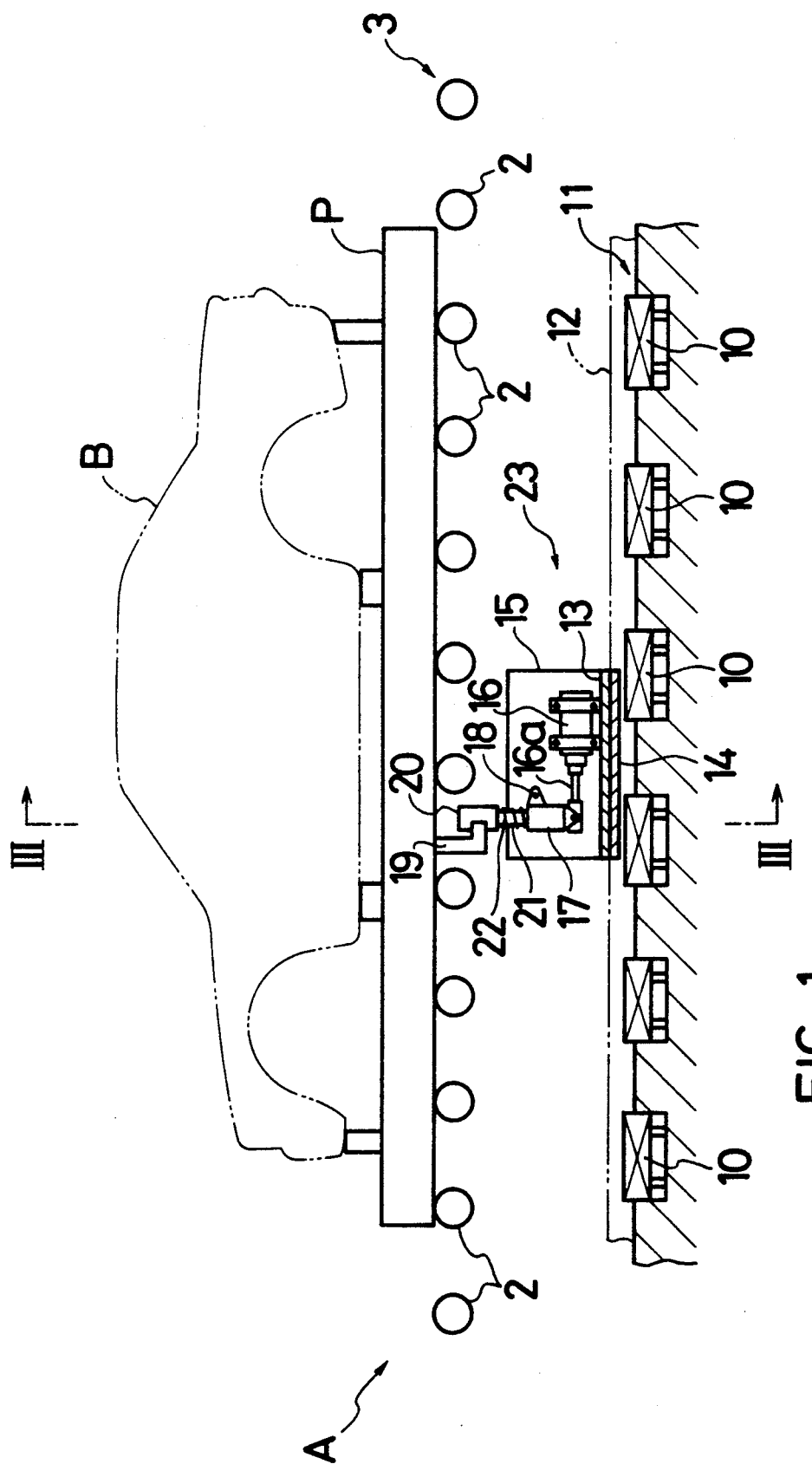
Figure 2:
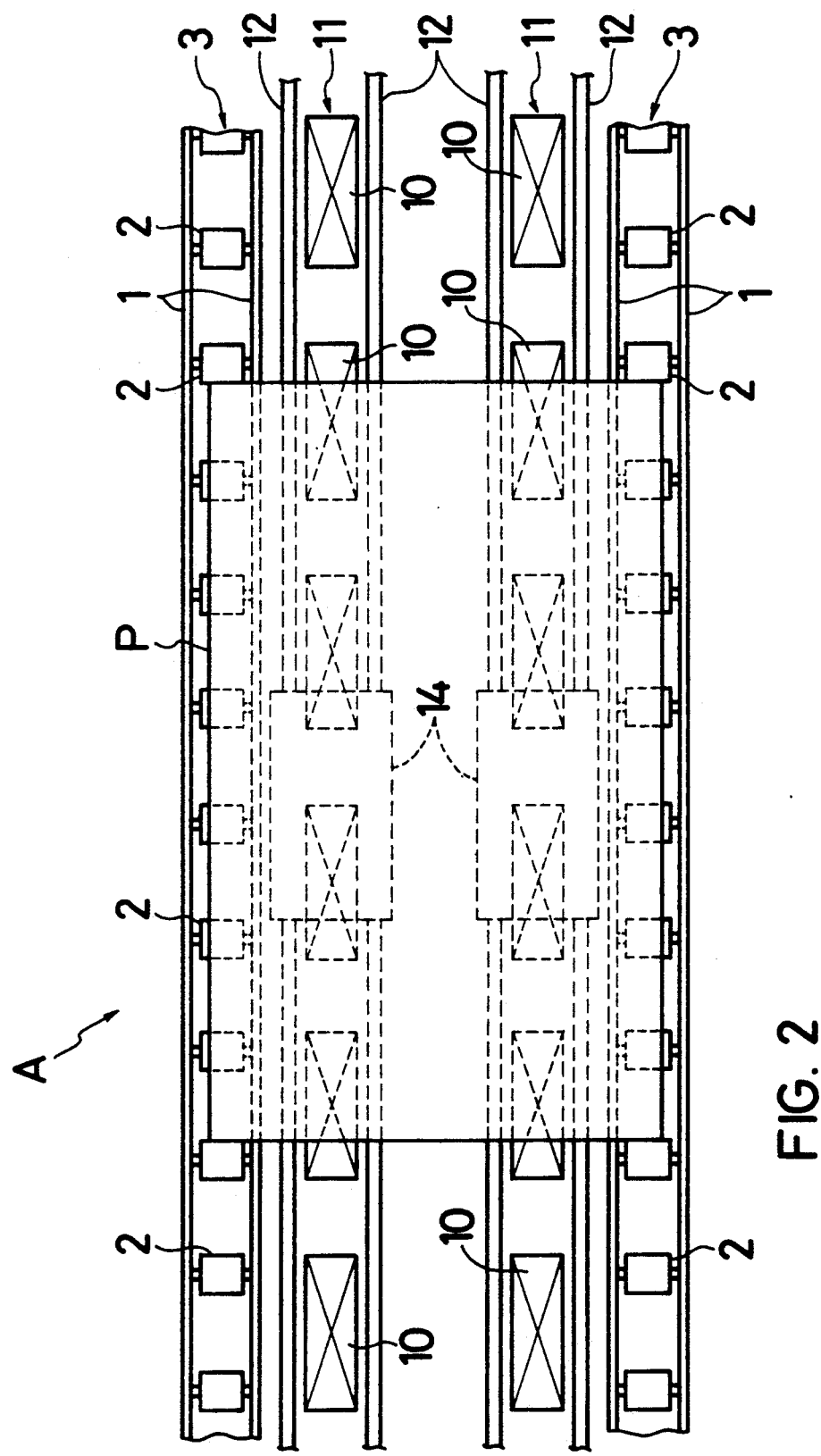
Figure 3:
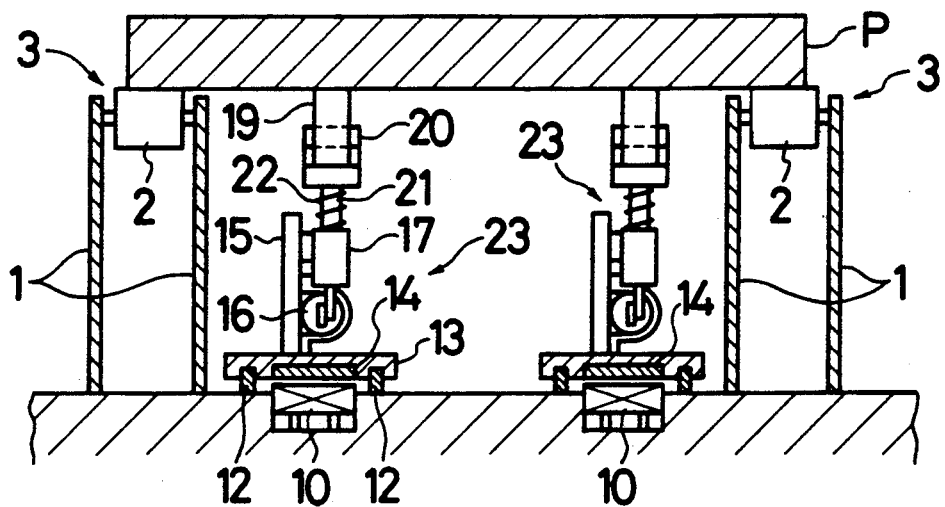
Figure 5:
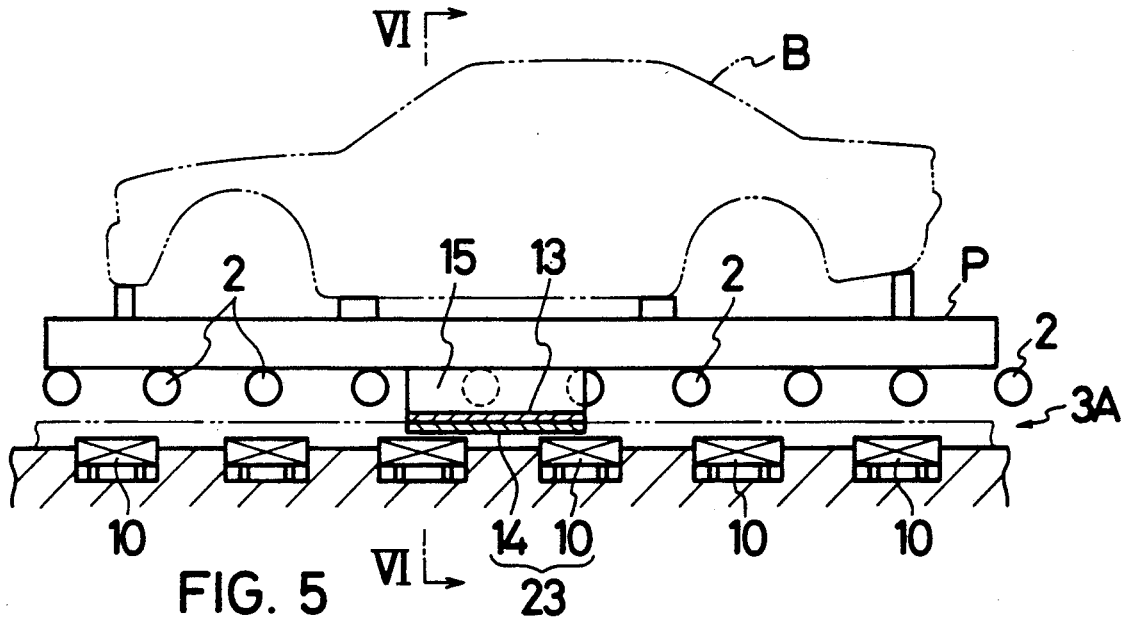
Figure 6:
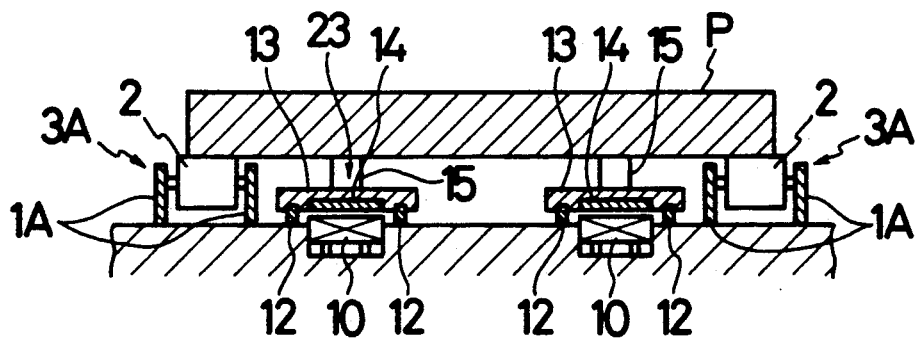

FIG. 1 to FIG. 3 show a first embodiment in which a conveyor means A using a linear motor is applied to a motor vehicle assembling line. This conveyor means A conveys a pallet P (as an article to be conveyed) on which a car body B is placed between adjoining working stations within the fixed period of time.

The pallet P is supported movably by a roller conveyor 3 comprising many rollers 2 fitted rotatably to support members 1 on both sides of the transporting line and is conveyed as it is sliding on the roller conveyor 3. Provided in parallel inside the above two support members 1 are two stator (fixed element) rows 11, each comprising many linear motor coils 10 which are stators (comb teeth-shaped iron cores around which exciting coils are wound, for example). Provided on both sides of each stator row 11 are two guide rails 12. A reaction member 14 (to be described later) is guided by the guide rails 12 along the stator row 11. Engagement of the guide rail 12 with a plate member 13 does not restrict the upper displacement of the plate member 13.

The first plate 13 is engaged movably with the upper side of the guide rail 12. The reaction member 14 (a rotor or a moving element which is, for example, a laminated sheet of iron and aluminium) is fitted to the under surface of the central part (in right and left direction) of the first plate 13. Thus, a linear motor 23 is composed by the linear motor coils 10 and the reaction member 14 and this linear motor 23 is provided for the working station, at the rate of one for each station.

Fitted to the upper surface of the first plate 13 is a second plate 15 which extends upward. Provided at the lower part of the second plate 15 is a cylinder 16 (in longitudinal direction) having a piston rod 16a extending to the downstream side in the conveying direction. Connected to a forward end of the piston rod 16a of the cylinder 16 is a lower end portion of a tubular member 17 disposed in vertical direction. The tubular member 17 is supported revolvably about an axis 18 to the second plate 15. Inserted in the tubular member 17 is a base end portion of a rod 21 having at its forward end an engaging block 20 which is engageable with and disengageable from an engaging projection member 19 projecting downward from the under surface of the pallet P. A coil spring 22 is wound around the rod 21.

The reaction member 14 is moved to the downstream side in the conveying direction along the stator row 11 by thrust which is generated by electromagnetic action between linear motor coils of stator row 11, whereby the body B on the pallet P with the engaging projection member 19 engaged with the engaging block 20 is conveyed between adjoining working stations within the fixed period of time.

After the pallet P (article to be conveyed) is conveyed to the working station at the downstream side, by turning the rod 21 about the axis 18 clockwise (FIG. 1) by extending operation of the cylinder 16, engagement of the engaging block 20 with the engaging projection member 19 is released and the engaging block 20 is shunted downward. In this state, the reaction member 14 which is at the adjoining working station on the downstream side is moved back to the working station at the upstream side.

When the pallet P moves on rollers 2 of the roller conveyor 3 by the operation of the linear motor 23, for example, there are caused fluctuations in vertical direction but such fluctuations are absorbed by the coil spring 22 wound around the rod 21 and thus fluctuations in vertical direction of the reaction member 14 do not occur.

Figure 4:
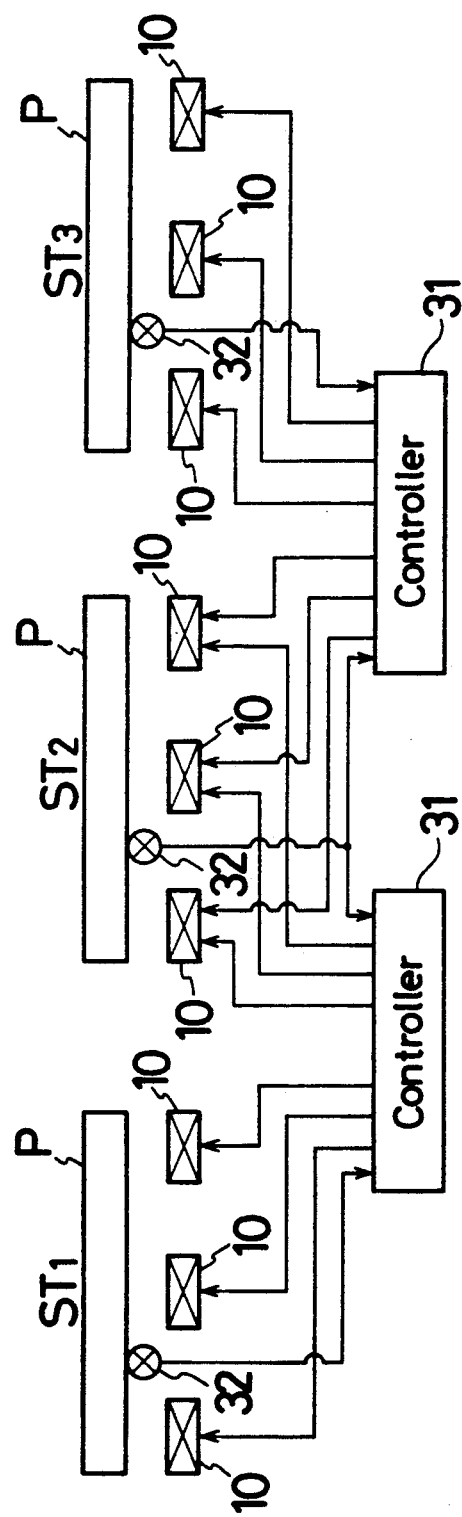

FIG. 4 shows a rough composition of the control system for controlling the linear motor 23. In this figure, reference numeral 31 designates a controller which is provided between every adjoining working station ($ST_1$ and $ST_2$, $ST_2$ and $ST_3$). When the pallet P is conveyed by corresponding two linear motors 23 between corresponding adjoining stations, the controller 31 controls the working (more particularly, excitation of the linear motor coil 10) of the two linear motors 23. Reference numeral 32 designates a speed sensor comprising an encoder, etc. for detecting the conveying speed of a pallet P provided at each working station. Detecting signals of each speed sensor 32 are inputted to two controllers 31 which control the working stations corresponding to that speed sensor 32 and adjoining working stations, for the control of working of the linear motors 23 by the controller 31.

Figure 25:
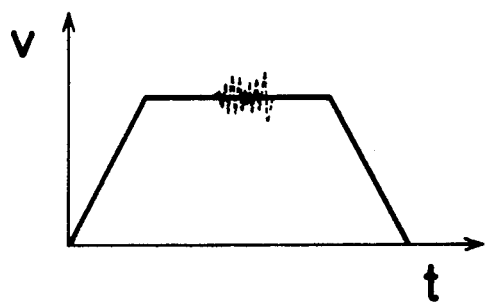
FIG. 25 is a characteristic drawing, showing the change in transporting speed at the time of transporting a pallet.
Figure 26:
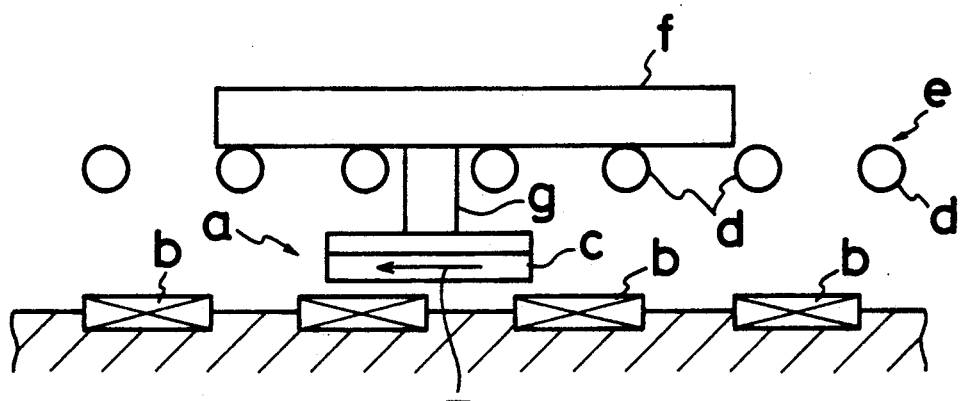
FIG. 26 shows a conventional conveyor means, similar to FIG. 1.

In this embodiment, in the case where the pallet P is conveyed between adjoining stations (for example, between the first working station $ST_1$ and the second working station $ST_2$ in FIG. 4), working (more particularly, excitation of the linear motor coil 10) of the linear motors 23 corresponding to the working stations $ST_1$, $ST_2$ is controlled by one controller 31 provided between the working stations $ST_1$, $ST_2$ at all stages covering acceleration at start, fixed speed conveying and deceleration stop, and a non-control area which is outside the control is not formed in the course of transportation. More particularly, while the first half part of transportation is carried out by the linear motor 23 corresponding to the first working station $ST_1$ controlled by the controller 31, the latter half part of transportation is carried out by the linear motor 23 corresponding to the second working station $ST_2$ controlled by the same controller 31. Therefore, conveying speed is stabilized to the set value as shown by solid line in FIG. 25 and as a result, precision of stop position and conveying efficiency can be improved.

Various modifications are possible for this embodiment. In this embodiment, the linear motor 23 is composed by linear motor coils 10 as stators and the reaction member 14 as a rotor but the linear motor 23 can be composed, for example, by providing the linear motor coils 10 on the first plate 13 side as rotors and arranging the reaction member 14 along the transporting line as a stator. Also, in this embodiment the conveyor means A is applied to the vehicle assembling line for conveying vehicle bodies, but it can be applied to conveyance of articles of other kind.

EMBODIMENT 2

FIG. 5 to FIG. 8 show a second embodiment in which a conveyor means is applied to the vehicle assembling line. This embodiment is common to the first embodiment in that the pallet P (article to be conveyed) on which the car body B is placed is conveyed between working stations arranged with the fixed space therebetween within the fixed period of time but is different from the first embodiment in that the plate member 13 is fixedly fitted to the under surface of the pallet P through the medium of the fitting member 15. Therefore, it is possible to lower the height of a roller conveyor 3A by lowering the height of the support member 1A.

Figure 7:
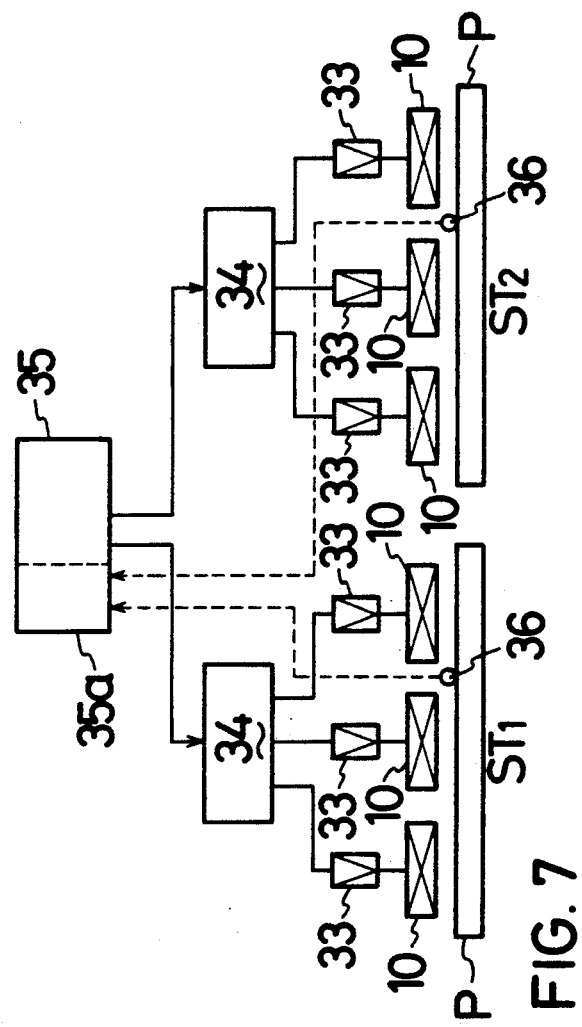

FIG. 7 shows a block composition of the control system for controlling the linear motor 23.

Three linear motor coils 10 are arranged at each working station $ST_1$, $ST_2$. Each linear motor coil 10 is connected to a linear motor controller 34 through the medium of a phase controlling part (amplifier) 33. This linear motor controller 34 carries out only phase control for exciting the linear motor coil 10 of the linear motor 23.

In each working station $ST_1$, $ST_2$, linear motor controllers 34 of adjoining working stations are connected with each other by a sequence controller 35. Reference numeral 36 designates a position detecting sensor (pulse generator, for example) which detects the moving position, namely, the moving distance of the pallet P which is being conveyed between adjoining working stations $ST_1$, $ST_2$. Speed signals from the position detecting sensor 36 are inputted to the sequence controller 35 (pulse counter part 35a).

It is so designed that the sequence controller 35 receives signals from the position detecting sensor 36 and carries out speed control of linear motors 23 of the two working stations $ST_1$, $ST_2$, while monitoring the state of the transporting pallet P at adjoining working stations $ST_1$, $ST_2$.

Figure 8:
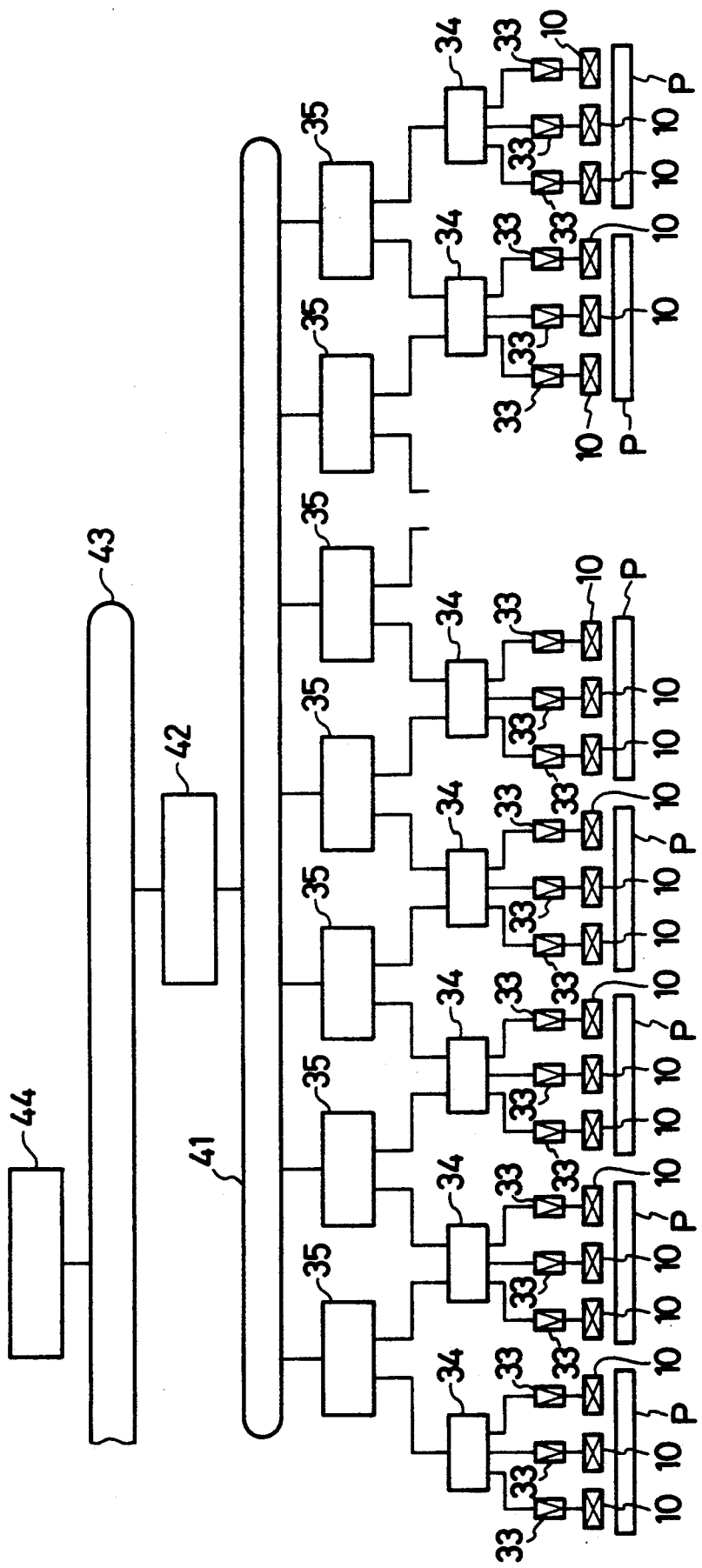

Each sequence controller 35, as shown in FIG. 8, is controlled by a line controller 42 through the medium of the area LAN 41 (local area network) and the transportation of transporting pallets P in the whole transporting line is controlled collectively. The line controller 42 is also controlled by a post computer 44 for factory through the medium of a LAN 43 in the factory. Control signals and information signals are sendable and receivable among the controllers 34, 35, 42.

Under the above composition, the speed of the transporting pallet P between adjoining working stations is detected by the position detecting sensor 36 and the result of detection (speed signal) is inputted to the sequence controller 35. On the basis of the speed signal, the sequence controller 35 controls the excitation of the linear motor 23 through the medium of the linear motor controller 34, whereby transfer of the transporting pallet P between the two working stations is done smoothly and easily. In this control, in case of emergency when a trouble occurs, the sequence controller 35 sends a stop signal directly to the phase control part 33 for stopping the linear motor instantly. Thus, one sequence controller 35 controls directly two adjoining linear motor controllers 34 and accordingly, reliability of control is satisfactory.

Even if a trouble occurs at any one of the working stations, only the working of the sequence controller 35 for that working station becomes impossible but the working for other working stations remains unchanged. Therefore, transfer of the transporting pallet P at other stations is possible in such case.

EMBODIMENT 3

Figure 9:
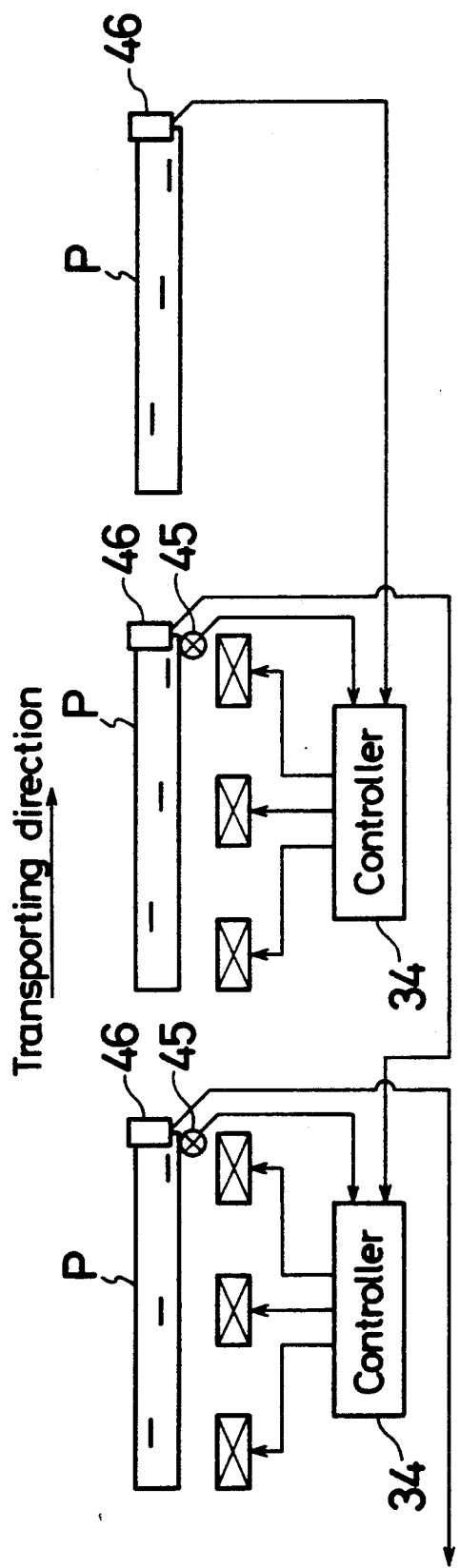

FIG. 9 shows the block composition of a different embodiment of the control system for controlling the linear motor 23.

In FIG. 9, reference numeral 45 designates a speed detecting means comprising an encoder which detects the conveying speed of the transporting pallet P which is being conveyed between adjoining working stations. Numeral 46 designates a position detecting means which detects the present position of the pallet P which is being conveyed between adjoining working stations.

Signals from the speed detecting means 45 which detects the conveying speed of the pallet P between the corresponding working station and the working station on the front side in the conveying direction (on the right side in FIG. 9) and signals from the position detecting means 46 which detects the present position of the pallet between the working station on the front side in the conveying direction of the corresponding working station and the working station which is on the further front side are inputted to the linear controller 34 which is provided corresponding to the linear motor 23 at each working station and controls the working (more particularly, switching of electrification to each linear motor coil) of the linear motor 23.

Figure 10:
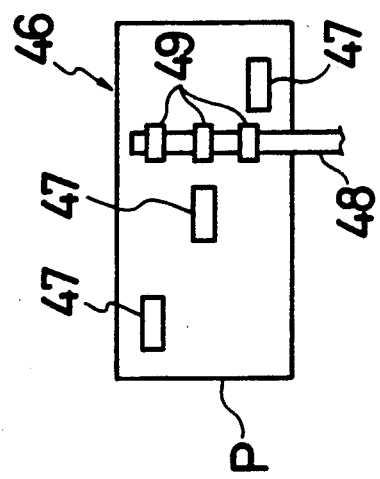

Specifically, the position detecting means 46 has three reflector tapes 47 and three photo-sensor 49 provided on a support member 48, corresponding to each reflector tape 47, as shown by FIG. 10. The transportation start position (acceleration start position), fixed speed transportation moving position and deceleration start position of the pallet P are detected by the position at which light projected from each photo-sensor 49 is reflected by the reflector tape 34.

The control on working of the linear motor 23 by the linear controller 34 or control of transportation of the pallet P is explained below, with reference to FIG. 11. In the case where the pallet P is conveyed between adjoining working stations, conveyance of the pallet P (working of the linear motor 23) is controlled by the sequence controller 35 in such a fashion that the first half part of conveyance is controlled by the linear controller 34 corresponding to the working station on the rear side in the conveying direction and the latter half part of conveyance is controlled by the linear controller 34 corresponding to the working station on the front side in the conveying direction. Therefore, the control flow chart in FIG. 11 shows, for convenience's sake, the control on the conveyance of the pallet P between adjoining working stations by a pair of linear controllers 34 and the sequence controller 35 as a series of control.

Figure 11:
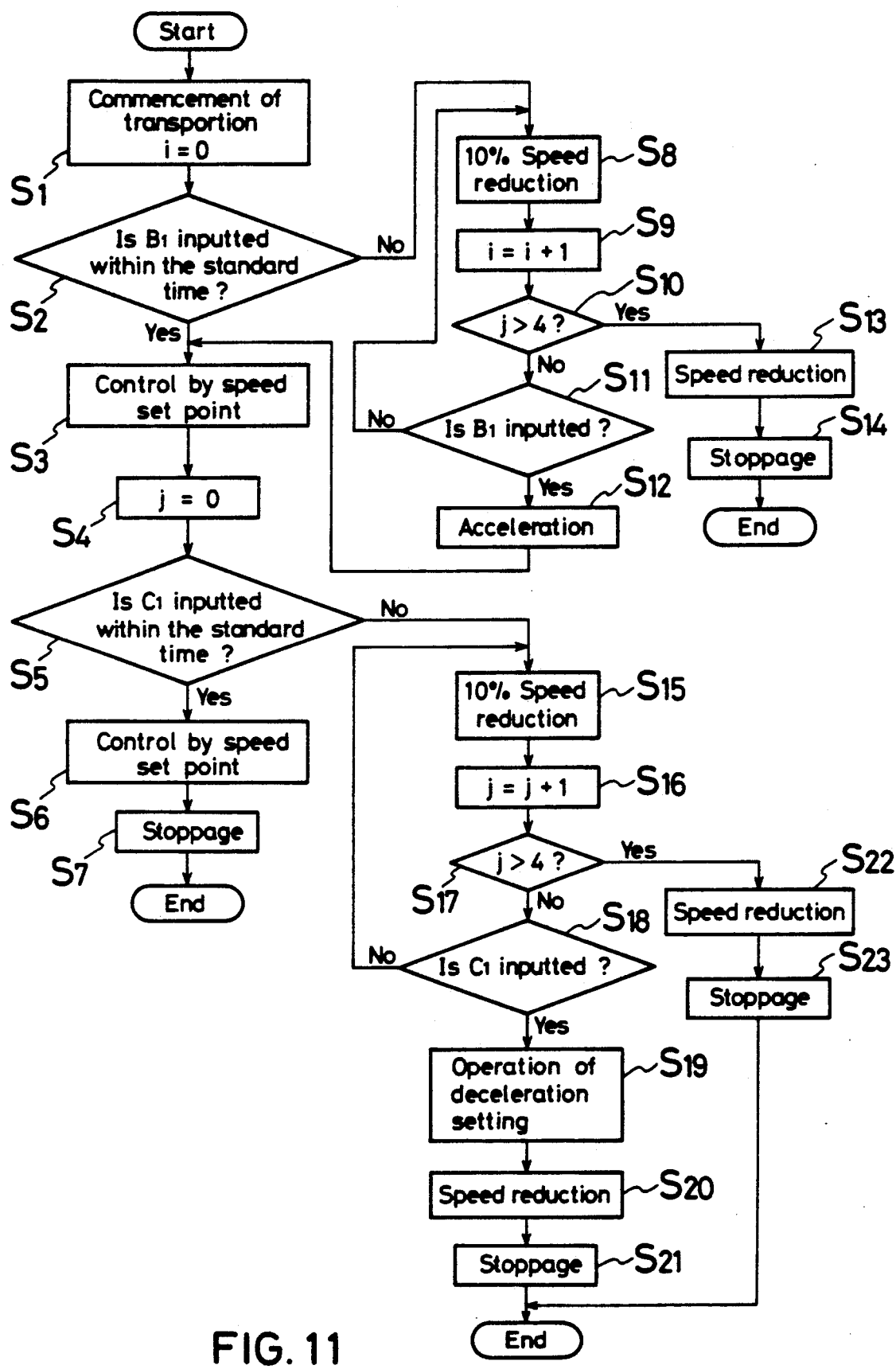

In FIG. 11, at the step $S_1$ the linear motor 23 is worked when the fixed hour elapsed after $A_1$ signal was received from the position detecting means 46 to the effect that the pallet P (hereinafter referred to as the front side pallet) on the front side in the conveying direction is at the transportation start position and the transfer of the pallet P is started at the fixed acceleration and a counter i is set "0".

Then, at the step $S_2$ it is judged whether or not $B_1$ signal to the effect that the front side pallet P is at the fixed speed transportation moving position has been inputted within the standard period of time from the position detecting means 46. If the judgement is "YES", at the step $S_3$ the transporting speed of the pallet P is controlled on the basis of the present speed value. By this control, transportation at the fixed acceleration is continued for the fixed period of time after $B_1$ signal was inputted but thereafter transportation is continued at the fixed speed.

At the step $S_4$, a counter J is set "0". Then, at the step $S_5$, it is judged whether or not $C_1$ signal to the effect that the front side pallet P is at the deceleration start position has been inputted within the standard period of time from the position detecting means 46. If the judgement is "YES", at the step $S_6$ the transporting speed of the pallet P is controlled on the basis of the present speed value. By this control, transportation at the fixed speed is continued for the fixed period of time after $C_1$ signal was inputted but thereafter transportation is continued at the fixed deceleration.

Figure 12A:
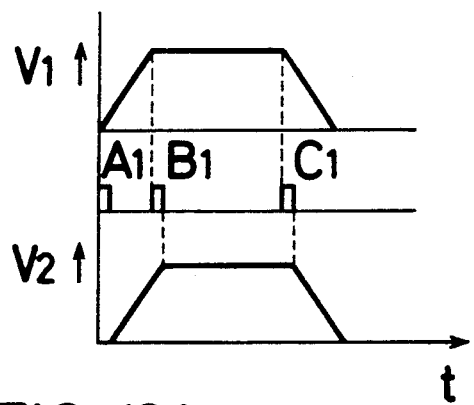
FIG. 12A, FIG. 12B and FIG. 12C show respectively the mutual relation between the transporting speed of adjoining pallets and each signal of the position detecting means.

When the pallet P is conveyed to the specific position of the working station on the front side in the conveying direction and its conveying speed is reduced to "0", at the step $S_7$ working of the linear motor 23 is stopped. Thus, when the front side pallet P is conveyed normally as specified, transportation control on the succeeding pallet P terminates. FIG. 12A shows the mutual relation between the transporting speed of front and rear pallets P and the signal of the position detecting means 46. As is obvious from FIG. 12A, the transporting speed $V_2$ of the rear side pallet P (lower part) varies in phase at the delay of specific time in relation to the transporting speed $V_1$ of the front side pallet P (upper part).

If the judgement at the step $S_2$ is "NO", namely, if transportation of the front side pallet P is delayed and $B_1$ signal from the position detecting means 46 is not inputted within the standard period of time, at the step $S_8$ transporting speed of the pallet P is decelerated by 10%.

Then, at the step $S_9$ the counter i is counted up and at the step $S_{10}$ it is judged whether or not the counter i is more than 4. If the judgement is "NO", at the step $S_{11}$ it is judged whether or not $B_1$ signal has been inputted at that point of time. If the judgement is "YES", at the step $S_{12}$ the transporting speed of the pallet P is restored to the original speed and is put back to the step $S_3$. If the judgement at the step $S_{11}$ is "NO", it is put back to the step $S_8$.

Figure 12B:
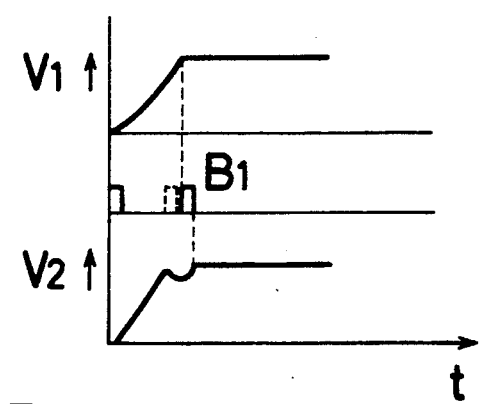

If the judgement at the step $S_{10}$ is "YES", namely, if the counter i is more than 4 and input of $B_1$ signal is fairly delayed, the transporting speed is decelerated at the step $S_{13}$ by reason of occurrence of abnormality in the conveyor means and when the transporting speed is reduced to "0", at the step $S_{14}$ working of the linear motor 23 is stopped. FIG. 12B shows the mutual relation between the transporting speed of the front and rear pallets P when $B_1$ signal was inputted behind time and the signal of the position detecting means 46.

If the judgement at the step $S_5$ is "NO", namely, if the transportation of the front side pallet P is delayed and $C_1$ signal from the position detecting means 46 is not inputted within the standard period of time, at the steep $S_{15}$ the transporting speed of the pallet P is decelerated by 10%.

Then, at the step $S_{16}$ the counter j is counted up and at the step $S_{17}$ it is judged whether or not the counter j is more than 4. If the judgement is "NO", at the step $S_{18}$ it is judged whether or not $C_1$ signal has been inputted at that point of time. If the judgement is "YES", at the step $S_{19}$ the deceleration setting operation for stopping the pallet P at the specified position of the working station on the front side in the conveying direction is carried out and then at the step $S_{20}$ the transporting speed of the pallet P is accelerated by the acceleration obtained by the operation. When the pallet P is conveyed to the specified position of the working station on the front side in the conveying direction and its transporting speed is reduced to "0", working of the linear motor 23 is stopped at the step $S_{21}$.

Figure 12C:
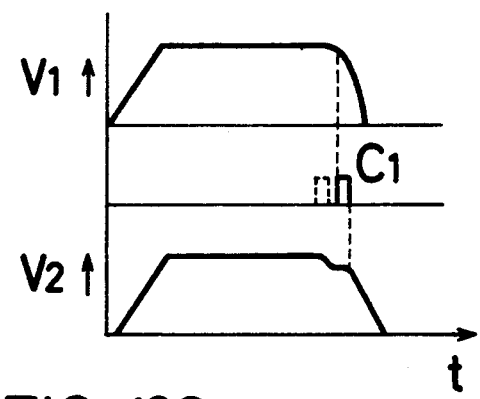

If the judgement at the step $S_{18}$ is "NO", it is put back to the step $S_{15}$. If the judgement at the step $S_{17}$ is "YES", namely, if the counter j is more than 4 and input of $C_1$ signal is fairly delayed, at the step $S_{22}$ transporting speed is decelerated by reason of the occurrence of abnormality in the conveyor means and when the transporting speed is reduced to "0", working of the linear motor 23 is stopped at the step $S_{23}$. FIG. 12C shows the mutual relation between the transporting speed of the front and rear pallets P when input of $C_1$ signal was delayed and the signal of the position detecting means 46.

In order to maintain the distance between adjoining front and rear pallets at more than the fixed value by a series of steps $S_2$, $S_8$–$S_{14}$ for decelerating the transporting speed of the rear side pallet P and by a series of steps $S_5$, $S_{15}$–$S_{23}$ for decelerating the transporting speed of the rear side pallet P when input of $C_1$ signal was delayed, a correcting means 51 for correcting the transporting speed of the rear side pallet P is composed.

Since the transportation of the rear side pallet P is started while the front side pallet P in the conveying direction is being conveyed, time required for transportation at the production line as a whole can be shortened and as a result, transporting efficiency or production efficiency can be improved. Also, transportation of the front and rear pallets at the same time or the coincidence of starting time of the front and rear pallets can save consumption of electric power.

Moreover, in the case where transportation of the front side pallet P is delayed for some reason or other while the rear side pallet P is being conveyed and $B_1$ signal or $C_1$ signal from the position detecting means 46 which detects the present position of the front side pallet P is inputted behind time, the conveying speed of the rear side pallet P is decelerated lower than the present speed and the distance between the front and rear pallets P is kept at more than the specified value. Therefore, collision of pallets with each other can be prevented.

In this embodiment, the correcting means 51 is composed so that when the front side article (pallet) of two adjoining articles (pallets) is delayed in transportation, transporting speed of the rear side article (pallet) is decelerated lower than the present speed, but the correcting means 51 can be so composed that the transporting speed of the front side article (pallet) can be accelerated more than the present speed or the transporting speed of the front and the rear article (pallet) can be accelerated or decelerated as desired.

EMBODIMENT 4

Figure 13:
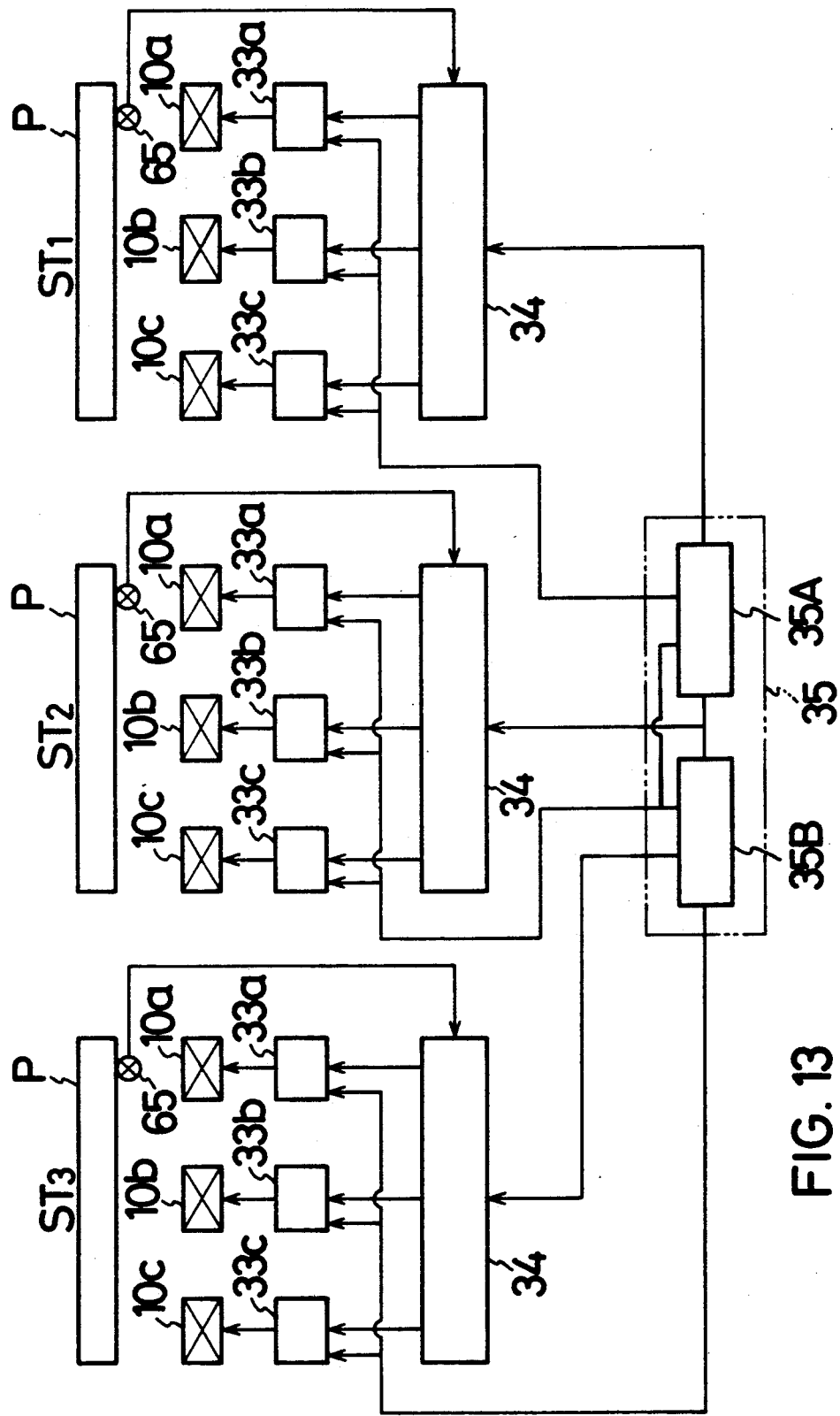

FIG. 13 shows the block composition of a different embodiment of the control system for controlling the linear motor 23.

Three linear motor coils 10a, 10b, 10c are arranged at each working station $ST_1$, $ST_2$, $ST_3$. Each linear motor coil 10a, 10b, 10c is phase-controlled for excitation by the linear motor controller 34 through the medium of the motor control part 33a, 33b, 33c. Adjoining linear motor controllers 34 are controlled collectively by the control parts 35A, 35B of the sequence controller 35.

Figure 14:
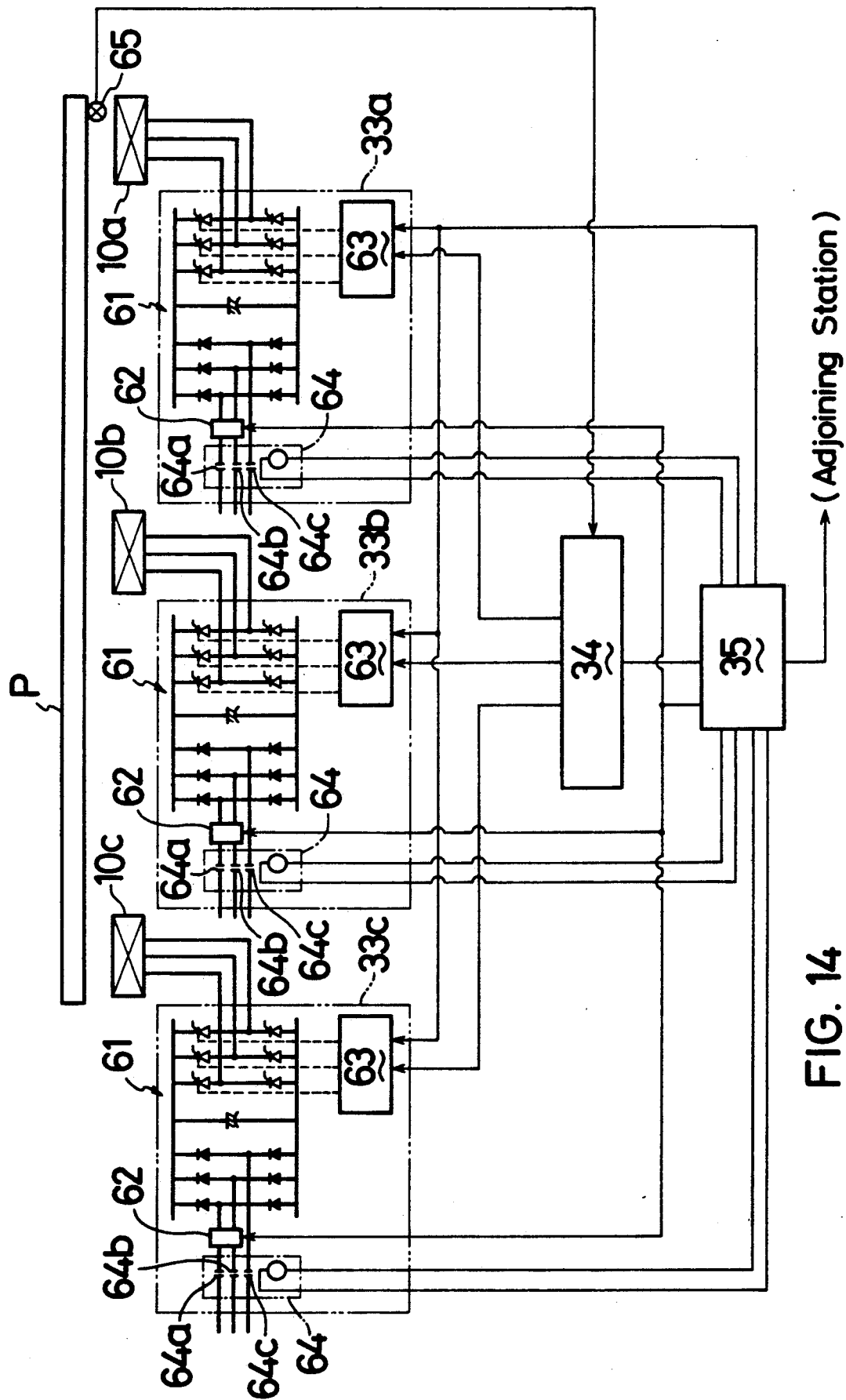
Figure 15:
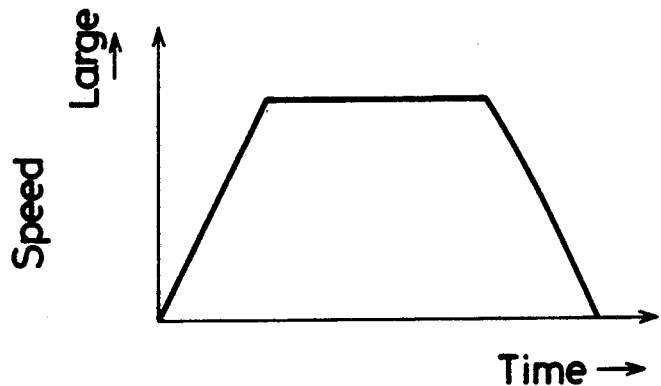

As shown in FIG. 14, each motor control part 33a, 33b. 33c has a thyristor circuit 61 connected to the linear motor coil 10a, 10b, 10c, a phase reversing circuit 62 which reverses two phases out of three phases, a phase-firing angle control circuit 63 which controls phase and firing angle of the linear motor 23 and a linear motor stop circuit 64 which is connected to the thyristor circuit 61 and the phase reversing circuit 62 and intercepts continuity of the thyristor circuit 61. The linear motor stop circuit 64 opens a contact 64a, 64b, 64c (which is closed normally) by a stop signal from the sequence controller 35 to stop the linear motor 23 suddenly.

The sequence controller 35 is connected to linear motor controllers 34 of the adjoining working station and carries out the speed control of the linear motor 23 of the working station, while monitoring the state of the pallet P at the two working stations. In the case where the pallet P on which the body B is placed is conveyed to each working station in regular sequence by the linear motor 23, between the first working station $ST_1$ and the second working station $ST_2$ in FIG. 13, for example, linear motor coils 10a, 10b, 10c are excited under the control of the sequence controller 35 and by thrust to be generated at the reaction member 14 by electromagnetic action between the linear motor coils 10a, 10b, 10c and the reaction member 14, the pallet P on which the body B is placed is conveyed between working stations at the specified speed which varies with the lapse of time.

Reference numeral 65 designates a speed sensor (pulse generator, encoder, for example) which detects the moving speed or transporting speed of the pallet P being conveyed between adjoining working stations and the speed signal from the speed sensor 65 is inputted to the sequence controller 35.

Under the above composition, normally the speed of the pallet P between adjoining working stations is detected by the speed sensor 65 and the result of detection (speed signal) is inputted to the sequence controller 35. On the basis of the speed signal, the sequence controller 35 controls the phase-firing angle control circuit 63 and the phase reversing circuit 62 through the medium of the linear motor controller 34 to control excitation of the linear motor coils 10a, 10b, 10c through the thyristor circuit 61, whereby transfer of the pallet between two working stations is effected. At this time, contacts 64a, 64b, 64c of the linear motor stop circuit 64 are in connected state.

Under the above composition, in case of emergency when a trouble occurred at any working station, contacts 64a, 64b, 64c of the linear motor stop circuit 64 are opened by the stop signal of the linear motor stop circuit 64 to intercept continuity of the thyristor circuit 61. Therefore, linear motor coils 10a, 10b, 10c are demagnetized and the pallet P stops instantly.

Figure 16:
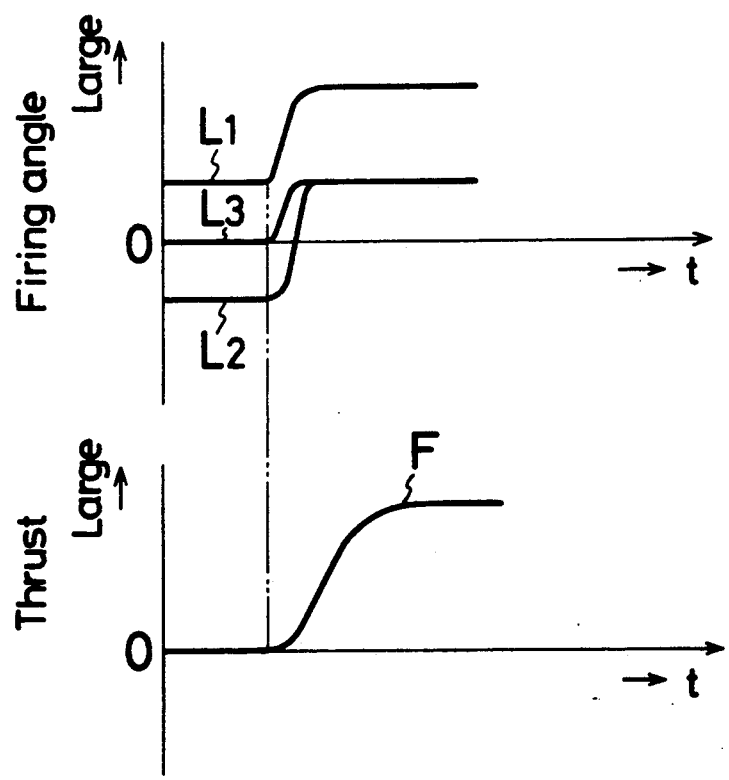

The control at starting is carried out as follows. The linear motor coil 10a which contributes to acceleration is excited for positive-phase (refer to FIG. 16 $L_1$), the linear motor coil 10c is excited for negative-phase (refer to FIG. 16 $L_2$) and the linear motor coil 10b is put in unexcited state (refer to FIG. 16 $L_3$). In this state, thrust of the pallet P is balanced and the pallet P does not move. Then, negative-phase excitation of the linear motor coil 10c is suspended and acceleration is started by positive-phase excitation of the linear motor coil 10a, immediately after which the linear motor coils 10b, 10c are also excited for positive-phase. Thus, it becomes possible to raise thrust abruptly at the initial stage of acceleration and thereafter the linear motor coil 10c which was excited for negative-phase and the linear motor coil 10b which was demagnetized are excited for positive-phase. Therefore, ample accelerating force is obtained.

EMBODIMENT 5

Figure 17:
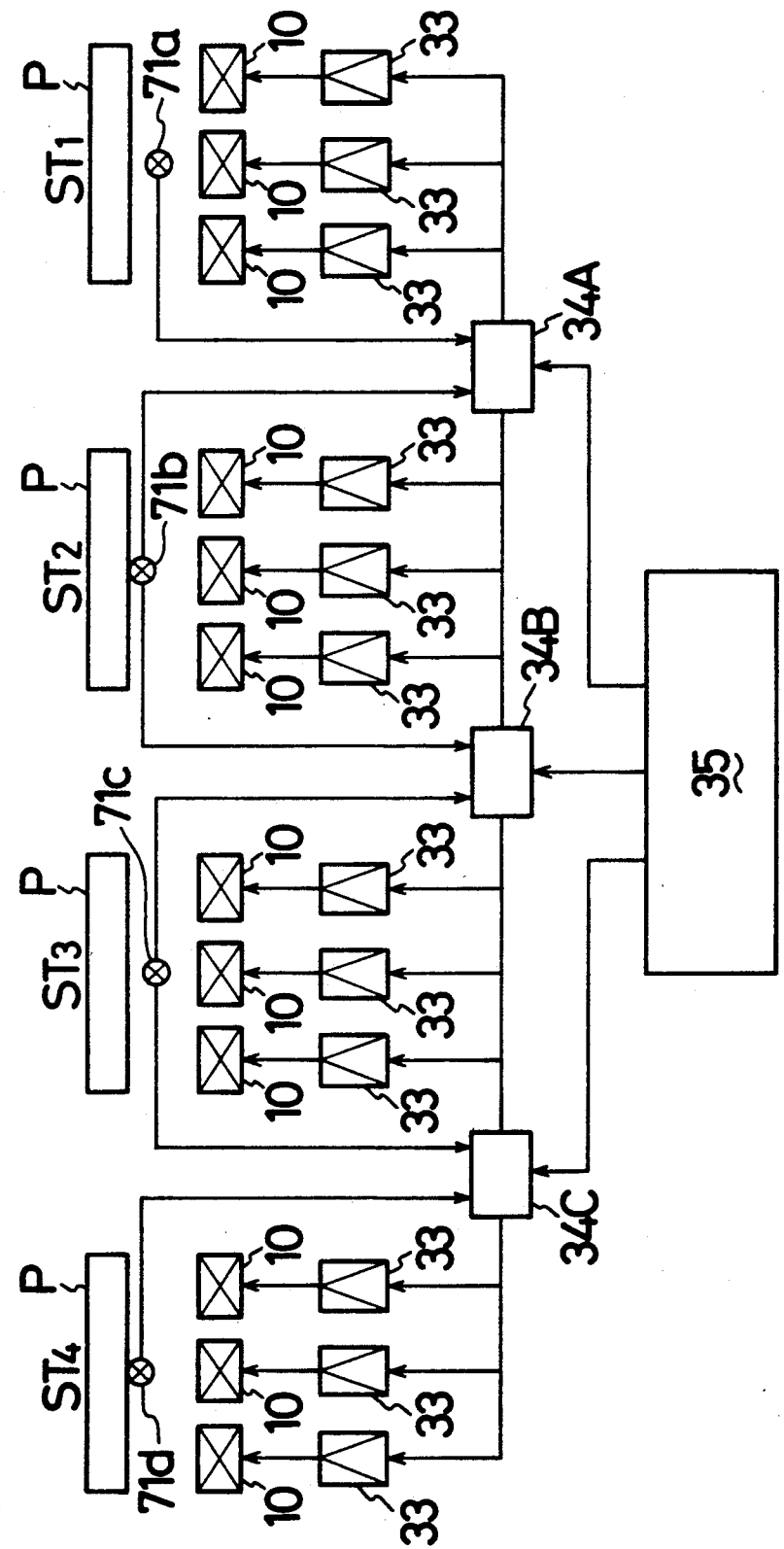

FIG. 17 shows the block composition of a different embodiment of the control system for controlling the linear motor 23.

Three linear motor coils 10 are arranged at each working station $ST_1$, $ST_2$, $ST_3$, $ST_4$. Each linear motor coil 10 is phase-controlled for excitation by the linear motor controllers 34A, 34B, 34C through the medium of the phase control part (amplifier) 33.

Figure 18:
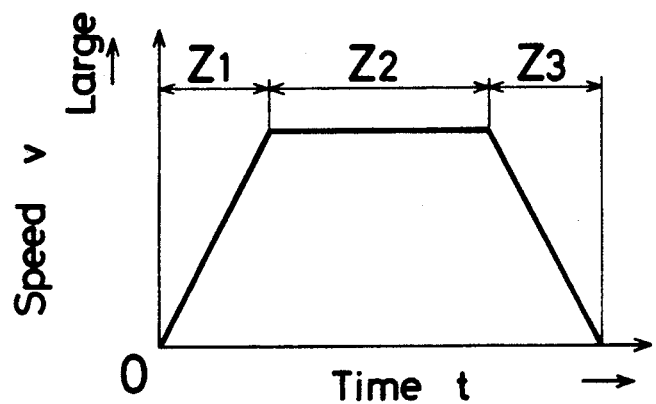

The linear motor controller 34A, 34B, 34C of the working stations $ST_1$, $ST_2$, $ST_3$, $ST_4$ are connected to the sequence controller 35. The station controller 33 carries out the speed control of the linear motor 23 of each station $ST_1$, $ST_2$, $ST_3$, $ST_4$ through the medium of the linear motor controllers 34A, 34B, 34C, while monitoring the state of the pallet P at each working station $ST_1$, $ST_2$, $ST_3$, $ST_4$. In the case where the pallet P on which the body B is placed is conveyed to each working station in regular sequence by the linear motor 23, between the first working station $ST_1$ and the second working station $ST_2$ in FIG. 17, for example, each linear motor coil 10 is excited under the control of the sequence controller 35 and by thrust to be generated at the reaction member 14 by electromagnetic action between the linear motor coil 10 and the reaction member 14, the pallet P on which the body B is placed is conveyed between working stations at the specified speed which varies with the lapse of time, as shown by FIG. 18. The speed variation comprises the acceleration area $Z_1$, the fixed speed area $Z_2$ and the deceleration area $Z_3$.

Each of reference numerals 71a, 71b, 71c, 71d designates a speed sensor (pulse generator, for example) which detects the moving speed or the transporting speed of the pallet P being conveyed between adjoining working stations. Speed signals from the speed sensors 71a, 71b, 71c, 71d are inputted to the linear motor controllers 34A, 34B, 34C.

Figure 19:
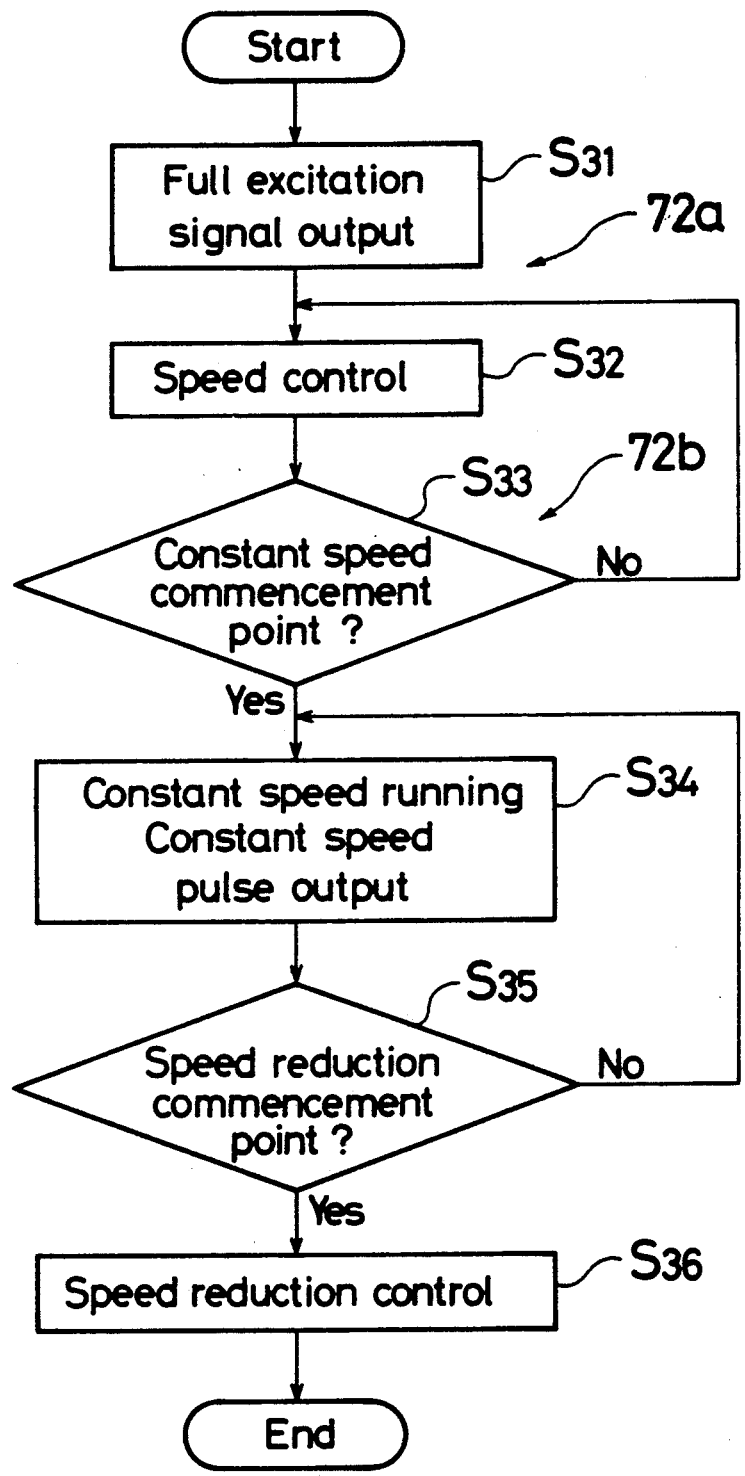

The control on the second working station $ST_2$ by the linear motor controller 34B, for example, is carried out as shown in FIG. 19. When the first working station $ST_1$ entered the fixed speed area $Z_2$ (refer to FIG. 18), this control is started.

At the step $S_{31}$, a positive-phase full excitation signal for acceleration at start is outputted to the linear motor coils 10 of the working station $ST_3$. Then, at the step $S_{32}$, the speed control for acceleration of the pallet P is carried out. An acceleration control means 72a for carrying out acceleration of article transportation at the fixed speed area for article transportation of the working station positioned frontward is composed.

At the step $S_{33}$, it is judged whether or not the second working station becomes the fixed speed station point. This judgement is done on the basis of the output of fixed speed starting pulse from the linear motor controller 32A.

If the second working station $ST_2$ does not become the fixed speed starting point, the speed control at the step $S_{32}$ is continued but if it becomes the fixed speed starting point, it is shifted to the step $S_{34}$ where the pallet P is moved at the fixed speed and the fixed speed starting pulse is outputted to the linear motor controller 32B. In this way, a fixed speed area detecting means 72b which detects the fixed speed area of article transportation is composed.

After running of the pallet P at the fixed speed, at the step $S_{35}$, it is judged whether or not the second working station $ST_2$ has become the deceleration starting point. If the second working station $ST_2$ does not become the deceleration starting point, it is put back to the step $S_{34}$ and the fixed speed running is continued, but if it becomes the deceleration starting point, it is shifted to the step $S_{36}$ where deceleration control is carried out by the negative-phase excitation to stop the pallet P at the specified stop point and the control terminates.

Figure 20:
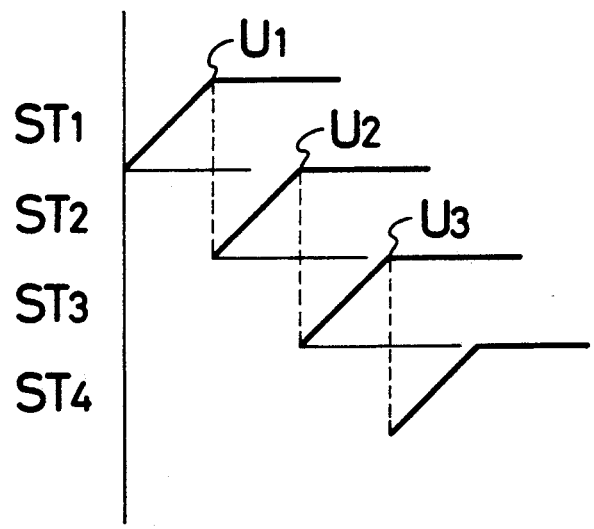

Under the above composition, as shown in FIG. 20 in the second working station $ST_2$, for example, if the fixed speed running starting point $U_1$ for transportation is reached at the first working station position frontward, acceleration for transporting the pallet P (article to be conveyed) is started and thus overlapping of acceleration areas of the first working station $ST_1$ positioned frontward and the succeeding second working station $ST_2$ can be avoided. Similarly, when the fixed speed running starting point $U_2$ for transportation is reached at the second working station, acceleration of the pallet P at the third working station $ST_3$ is started and when the fixed speed running starting point $U_3$ is reached at the third working station, acceleration of the pallet P at the fourth working station $ST_4$ is started.

Therefore, from the viewpoint of the transporting line as a whole, transportation action at each working station is carried out synchronously in part and the time required for transporting the pallet P (article to be conveyed) can be shortened.

Figure 21:
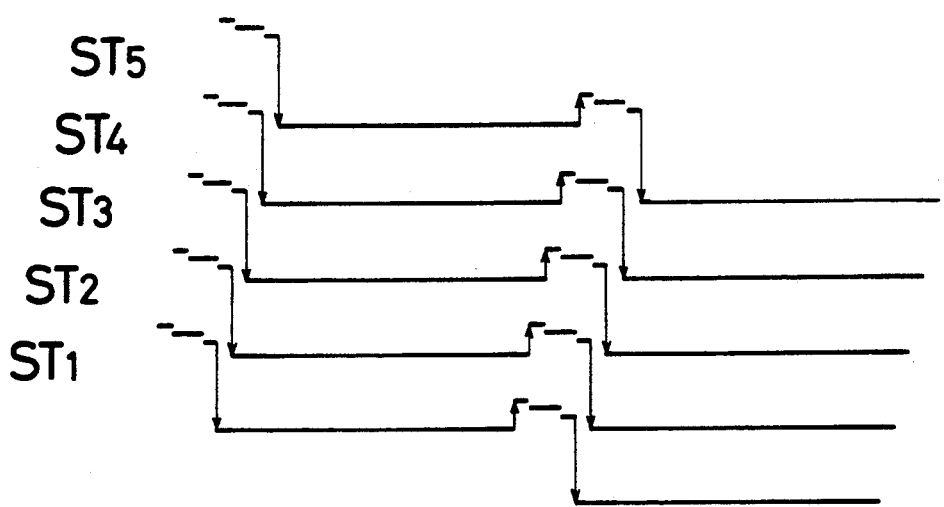
Figure 22:
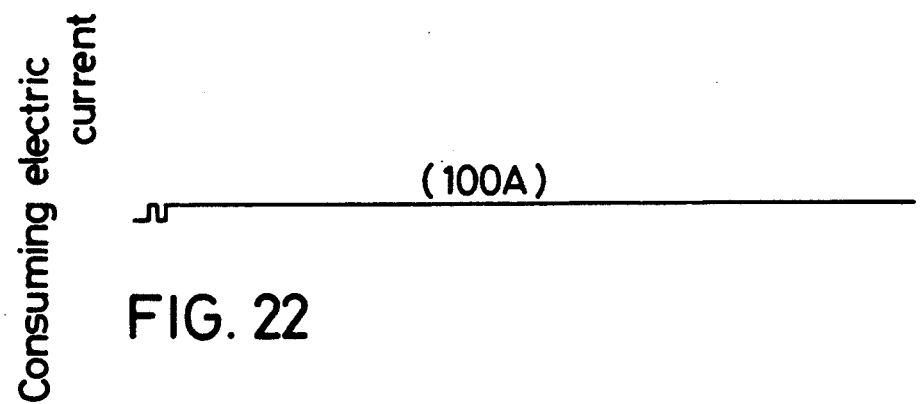
Figure 23:
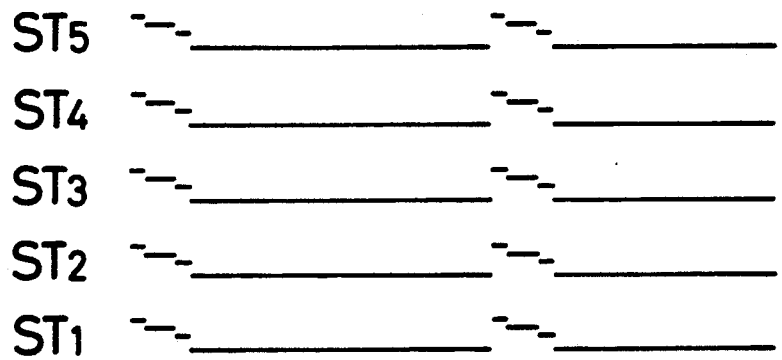
FIG. 23 shows the change in consumption electric current in the case where transporting action was completely synchronized, at five working stations.
Figure 24:
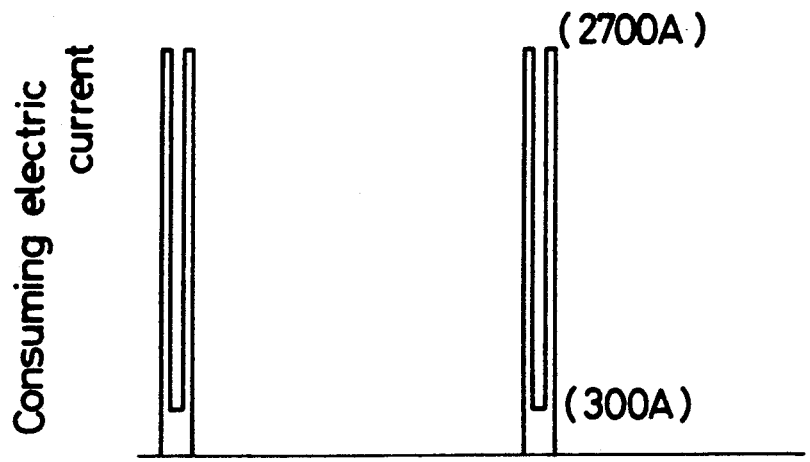
FIG. 24 shows the change in consumption electric current, in the case where transporting action was completely synchronized, at the transporting line as a whole.

In the above composition, possibility of overlapping of acceleration areas which involves large consumption of energy is lessened and as a result, possibility of overlapping of deceleration areas and overlapping of an acceleration area and a deceleration area is also lessened. As compared with the case of synchronizing action at each station perfectly, the above composition involves much less total amount of consuming energy. In concrete, in the case of the above composition, consumption electric current is 100A in the case where cycle time is 50 sec. (refer to FIG. 21 and FIG. 22), whereas in the case of perfect synchronization consumption electric current is 300A-2700A in the case where cycle time is 48 sec. (refer to FIG. 23 and FIG. 24). As compared with the case of perfect synchronization, the part synchronization of the present invention involves much less consumption electric current. These numerical value are in the case of 5 working stations.

What is claimed is:

1. In a conveyor of a type having pallet means for supporting an article, conveyor means for supporting said pallet means, and a plurality of sequential working stations, each of said working stations having a linear motor positioning means including a plurality of coils and a reaction member for engaging said pallet and conveying said pallet along said conveyor means adjacent said working station, and retractable pallet engaging means on said reaction member for selectively engaging and transmitting driving forces from said coils to said pallet means, controller means comprising:

a plurality of controllers, at least one of said controllers being connected to actuate said coils of two adjacent ones of said working stations; whereby said one controller controls said linear motors of both of said adjacent working stations such that a transition area between said adjacent working stations, wherein said pallet is not guided by a control, is eliminated.

2. A conveyor means using linear motors as defined in claim 1, wherein the controller is provided with a sequence controller which controls the transporting line and said sequence controller carries out speed control of the linear motors of two adjoining working stations.

3. A conveyor means using linear motors as defined in claim 2, wherein the controller is further provided with a linear motor controller which controls the linear motor for transportation and the sequence controller is so composed that it controls the transporting line through the medium of the linear motor controller which carries out phase control of linear motor excitation.

4. A conveyor means using linear motors as defined in claim 1, having a position detecting means to detect the present position of adjoining pallets being conveyed and the controller having a correcting means which receives a signal from said position detecting means and corrects the transporting speed of at least one of the adjoining pallets under control of said controller so as to keep the distance between the adjoining pallets at more than a specified value, wherein the controller is so composed that it controls working of linear motors so as to convey pallets at the present speed between adjoining working stations.

5. A conveyor means using linear motors as defined in claim 4, wherein the correcting means carries out control on articles on adjoining pallets so that adjoining pallets are conveyed at the same time after completion of work at the working station.

6. A conveyor means using linear motors as defined in claim 4, wherein the correcting means carries out control on adjoining pallets so that transportation of an article on a rear side pallet can be started while an article on a front side pallet is being conveyed.

7. A conveyor means using linear motors as defined in claim 1, wherein the controller is provided with a linear motor controller to control linear motors for transportation and a station controller to control the transporting line through the medium of the linear motor controller and control of linear motors under normal conditions is effected by the linear motor controller but in case of emergency a stop signal is outputted directly to the linear motor from the station controller.

8. A conveyor means using linear motors as defined in claim 1, the controller having a fixed speed area detecting means to detect the article transportation fixed speed area of each station and an acceleration control means which receives output of said fixed speed area detecting means and to effect acceleration for article transportation of the specific station at the article transportation fixed speed area of the station preceding said specific station, wherein the controller is so composed that it sends articles to a plurality of working stations in regular sequence by using a linear motor for transportation.

* * * * *